United States Patent

Ball

Patent Number: 5,487,577
Date of Patent: Jan. 30, 1996

[54] PLIANT UNITARY COUPLING ELEMENT DUAL HANDLED SHOVEL

[76] Inventor: Randall W. Ball, 178 Laird Cir., Panama City, Fla. 32408

[21] Appl. No.: 266,976

[22] Filed: Jun. 27, 1994

[51] Int. Cl.⁶ ............................. A01B 1/22; B25G 3/38
[52] U.S. Cl. .................................. 294/58; 16/114 R
[58] Field of Search .................... 294/54.5, 57–59; 15/143.1, 144.2, 145, 246; 16/110 R, 111 R, 112, 114 R; 403/220, 229

[56] References Cited

U.S. PATENT DOCUMENTS

| | | | |
|---|---|---|---|
| 483,477 | 9/1892 | Ryan | 294/57 |
| 911,291 | 2/1909 | Byor | 294/58 |
| 2,826,835 | 3/1958 | O'Shea | 294/58 X |
| 3,751,094 | 8/1973 | Bohler | 294/58 |
| 4,050,728 | 9/1977 | Davidson | 294/58 |
| 4,128,266 | 12/1978 | Vaslas | 294/58 |
| 4,200,324 | 4/1980 | Helton | 294/58 |
| 4,229,033 | 10/1980 | Vosbikian | 294/58 |
| 4,264,096 | 4/1981 | Barnett | 294/58 |
| 4,537,433 | 8/1985 | Yang | 294/58 |
| 4,615,553 | 10/1986 | Hultine | 294/58 |
| 4,787,661 | 11/1988 | Rutledge | 294/58 |
| 4,793,645 | 12/1988 | Decker | 294/58 |
| 4,944,541 | 7/1990 | Waldschmidt | 294/58 |
| 5,133,582 | 7/1992 | Rocha | 294/58 |
| 5,320,363 | 6/1994 | Burnham | 294/57 X |

FOREIGN PATENT DOCUMENTS

| | | | |
|---|---|---|---|
| 948860 | 8/1949 | France | 294/58 |
| 1109731 | 2/1956 | France | 294/58 |
| 410274 | 3/1925 | Germany | 294/58 |
| 915288 | 1/1963 | United Kingdom | 294/58 |
| 974584 | 11/1964 | United Kingdom | 294/58 |
| 2156641 | 10/1985 | United Kingdom | 294/58 |
| 8601071 | 2/1986 | WIPO | 294/58 |

*Primary Examiner*—Johnny D. Cherry
*Attorney, Agent, or Firm*—Peter Loffler

[57] ABSTRACT

A dual-handled shovel is disclosed. The device comprises a primary shovel and a secondary shovel handle. A pliant unitary coupling element attaches the secondary shovel handle to the primary shovel handle. The device permits extended movement ranges of each shovel handle relative to the other. The device permits shovel use in harsh shoveling environments without undue consequences and is easy to clean and maintain.

1 Claim, 3 Drawing Sheets

PLIANT UNITARY COUPLING ELEMENT DUAL HANDLED SHOVEL

BACKGROUND OF THE INVENTION

1. Field of the Invention

The present invention relates to a two-handled shovel and, more particularly, to a two-handled shovel wherein the secondary handle is springedly attached to the primary handle.

2. Background of the Prior Art

The desirability of two-handled shovels is evident. A two-handled shovel permits a user to use both arms in the shoveling process thereby reducing back strain.

Two-handled shovels are well known in the art. For example, U.S. Pat. No. 5,133,582 issued to Rocha discloses a two-handled shovel wherein the primary handle is attached to the secondary handle by a rotary bushing and U.S. Pat. No. 4,050,728 issued to Davidson discloses a universal joint for attachment purposes.

These and other examples in the art suffer from a major drawback. When used to shovel harsh elements, such as sand, snow, mud, plaster, asphalt, cement, etc., these shovels are readily susceptible to damage. These harsh elements will invade the rotational elements of the handle attachment means. This element invasion can cause problems such as attachment means clogging, lockup, and excessive wear and tear.

In order to overcome the stated problems, regular cleaning is called for. This may include disassembly of the attachment means and careful cleaning of the internal parts. Many users will dismiss such cleanings and will either use the shovel in a single handle mode or discard it for a standard one-handled shovel.

A two-handled shovel is needed where the attachment means is not easily susceptible to damage. Such a shovel must be operable in harsh shoveling environments without suffering undue clogging, lockup, or wear. Cleaning of the shovel's attachment means must be relatively simple without the need for disassembly.

SUMMARY OF THE INVENTION

The present invention meets the above-described needs. The present invention comprises a two-handled shovel wherein the secondary handle is attached to the primary handle by spring means.

By using a spring, the shovel is operable in harsh shoveling climates without undue problems posed by the elements being shoveled. By being a one piece device, the spring is not susceptible to clogging, undue lockup, or excessive wear and tear of interfacing parts. If an element, such as cement, invades the spring, cleaning is simple and straightforward. Spraying the spring off with an ordinary garden hose will suffice. Disassembly is not required.

The spring permits a large movement range of the secondary handle relative to the primary handle. The secondary handle returns to a relaxed stated when not in use.

Therefore, it is an object of the present invention to provide a two-handled shovel that is safely operable in adverse shoveling environments.

It is another object of the present invention to provide a two-handled shovel that is easy to clean and maintain.

It is a final object of the present invention to provide a two-handled shovel where the secondary handle enjoys a large movement range relative to the primary handle.

BRIEF DESCRIPTION OF THE DRAWINGS

Similar reference numerals refer to similar parts throughout the several views of the drawings.

DETAILED DESCRIPTION OF THE PREFERRED EMBODIMENT

Figure 1:
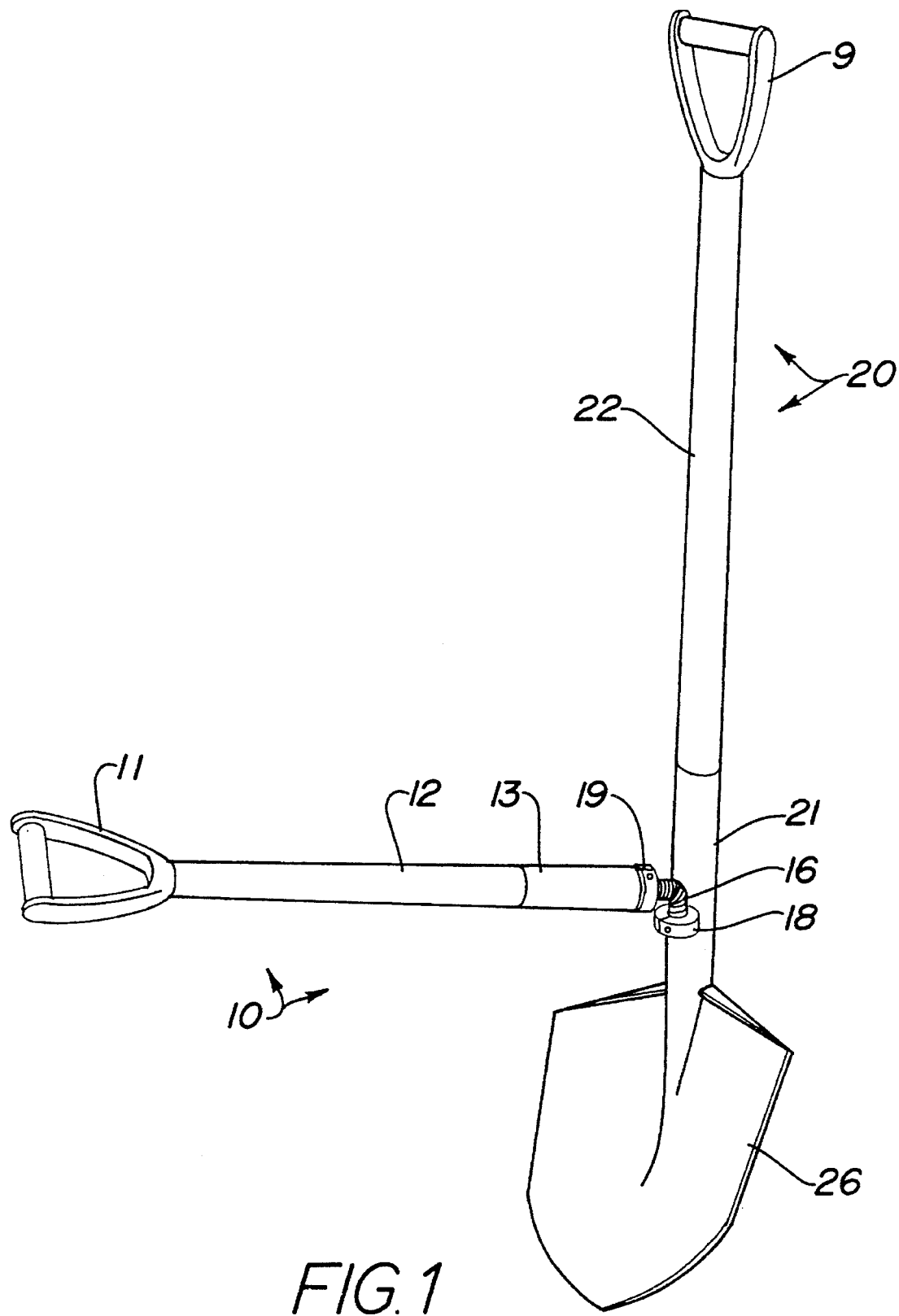
FIG. 1 is a perspective view of the device of the present invention with the secondary handle extended forward.

The present invention comprises a primary handle 20 and a secondary handle 10. The primary handle 20 comprises a shaft portion 22 with a hand grip 9 on one end and a metal portion 21 terminating in a shovel blade 26 on the opposing end. Weldably attached to first metal portion 21, at point 23, is a first clamp assembly 18.

The secondary handle 10 comprises a shaft portion 12 with a hand grip 11 on one end and a second metal portion 13 on the opposing end. Weldably attached to second metal portion 13, at point 14, is a second clamp assembly 19.

Figure 3:
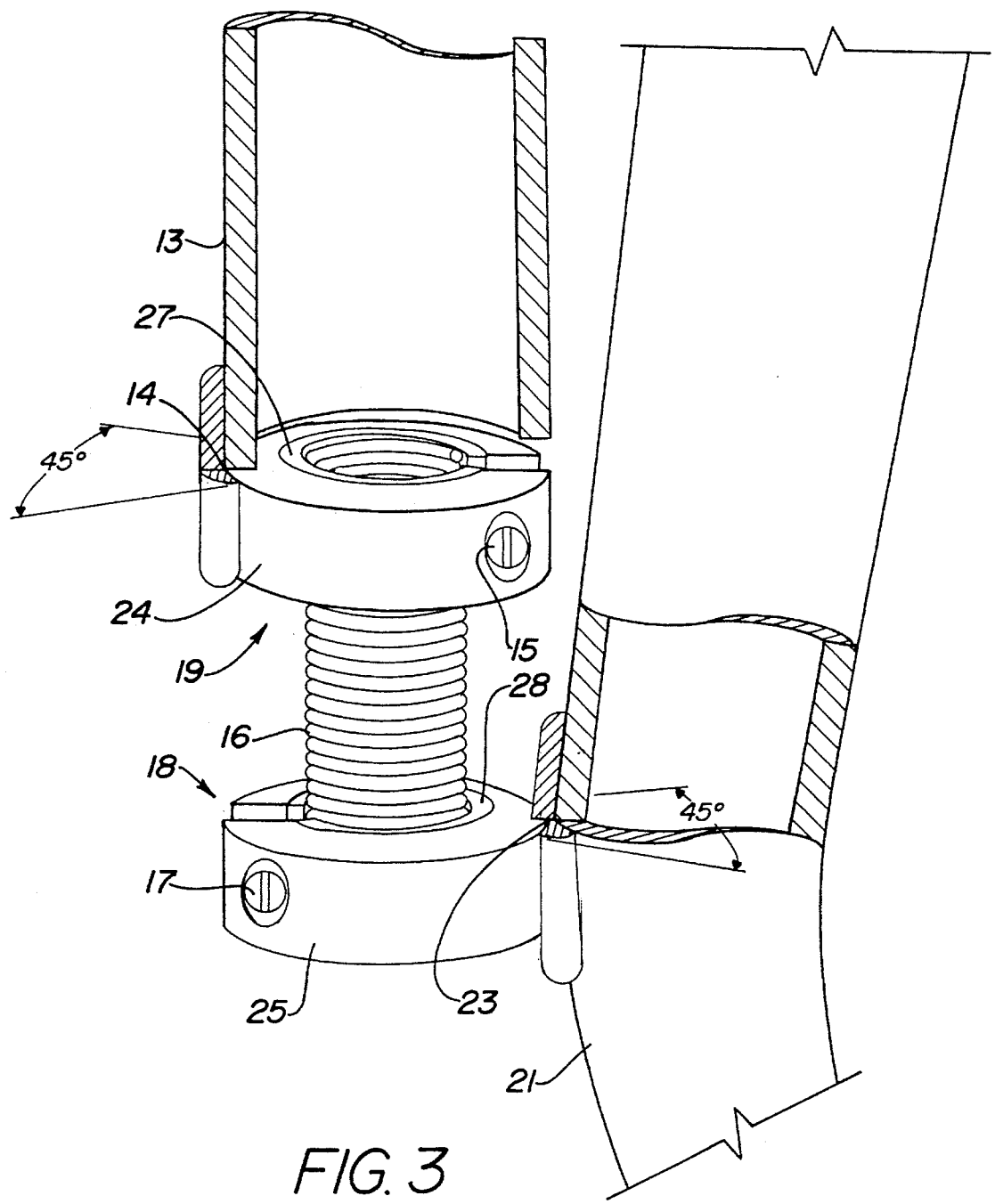
FIG. 3 is a side view of the spring coupling device of the present invention.

As seen in FIG. 3, the first one piece split clamp assembly 18 comprises a one piece split clamp 25, a split clamp threaded center 28 integrally disposed within the inner circumference of the one piece split clamp 25, and a clamp screw 17 for adjusting the clamp 25. The second one piece split clamp assembly 19 is similar to the first one piece split clamp assembly 18 and also comprises a one piece split clamp 24, a split clamp threaded center 27, and a clamp screw 15.

A coil spring 16 has one end securely disposed within the split clamp threaded center 28 of the first one piece split clamp assembly 18 and its opposite end securely disposed within the split clamp threaded center 27 of the second one piece split clamp assembly 19. The exact specifications of the coil spring 16 may be chosen with respect to the anticipated environment of the shovel.

Sufficient compression of the two threaded centers 27, and 28—in order to securely hold the coil spring 16—is assured by limiting the welding areas at points 14 and 23 to approximately a 45 degree sector perimeter region of the respective clamp assembly.

In order to unload the shovel blade 26, the primary handle 20 is radially twisted around the longitudinal axis of the coil spring 16. This trochoidal resilience is due to the torsionally yielding nature of the coil spring 16.

Figure 2:
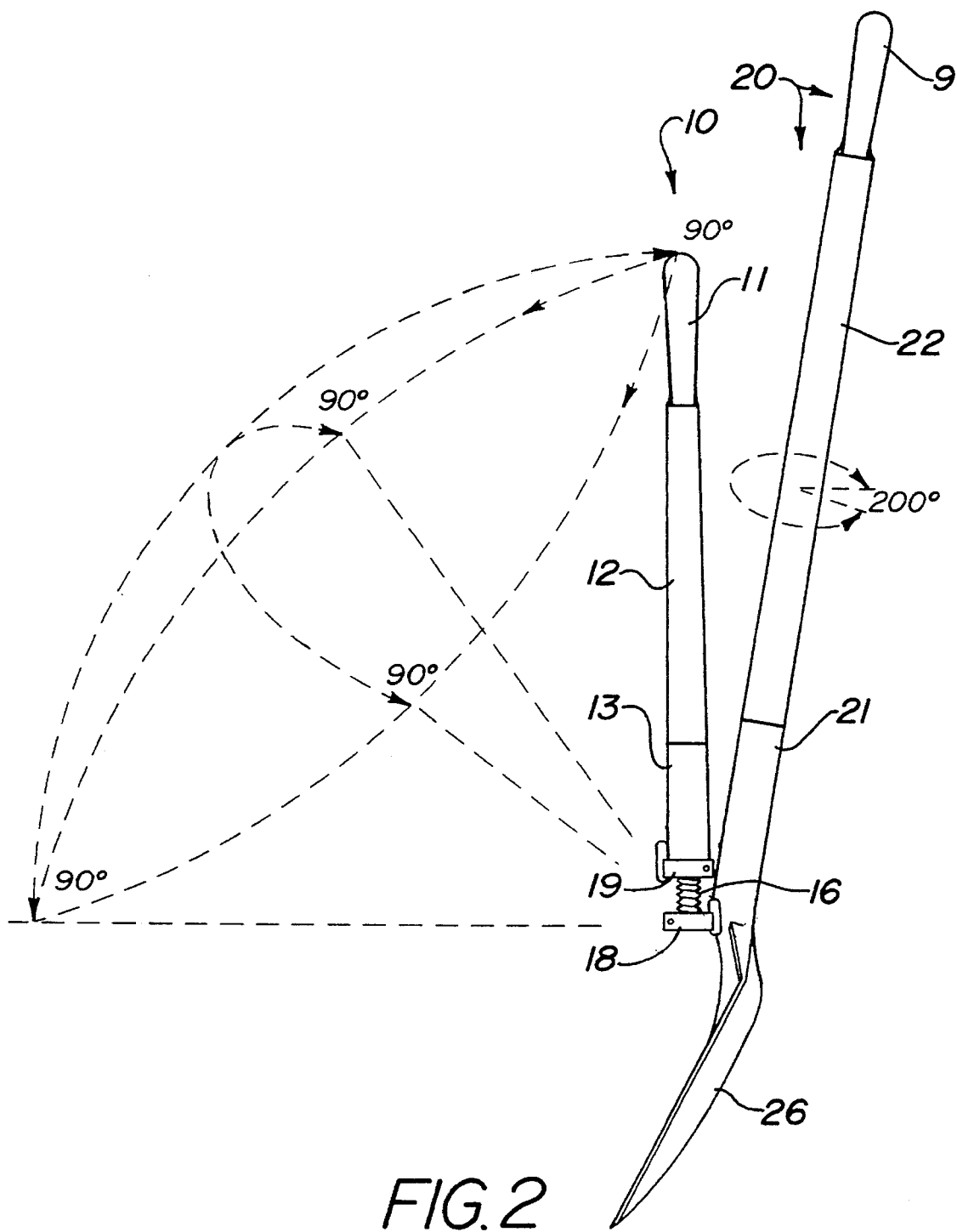
FIG. 2 is a perspective view of the device of the present invention in a relaxed mode showing the conical movement pattern range of the secondary handle and the radial movement range of the primary handle.

As seen in FIG. 2, the secondary handle 10 movement freedom must occur in any dimension off axis to the parallel plane forward of the primary handle 20. The second handle travel limit is the orthogonal position of the second handle 10 to primary handle 20 anywhere in a half hemisphere region occurring forward and away from primary handle 20. The bending or arching freedom of secondary handle 10, as permitted by coil spring 16, conforms to and operates in a conodial pattern. This circular pivotal freedom is due to the symmetrical unbiased nature of coil spring 16 to bend in any direction.

While the invention has been particularly shown and described with reference to an embodiment thereof, it will be understood by those skilled in the art that various changes in form and detail may be made without departing from the spirit and scope of the invention.

I claim:

1. A dual-handled shovel comprising:

a primary handle having a first hand grip on one end and a first metal portion terminating in a shovel blade on the opposing end;

a first spring holding assembly, comprising a first one piece split spring clamp with a threaded center, and a first clamp screw, attached to the first metal portion;

a secondary handle having a second hand grip on one end and a second metal portion on the opposing end;

a second spring holding assembly, comprising a second one piece split spring clamp with a threaded center, and a second clamp screw, attached to the second metal portion; and a coil spring having one end secured within the first one piece split spring clamp with a threaded center and its opposing end secured within the second one piece split spring clamp with a threaded center.

* * * * *